United States Patent
Kim et al.

(10) Patent No.: US 7,564,323 B2
(45) Date of Patent: Jul. 21, 2009

(54) RADIO FREQUENCY SWITCH

(75) Inventors: Duk-Yong Kim, Yongin-si (KR);
Young-Chan Moon, Suwon-si (KR);
Gil-Ho Lee, Yongin-si (KR);
Kang-Hyun Lee, Osan-si (KR)

(73) Assignee: KMW Inc., Hwasong-Shi, Kyonggi-Do (KR)

(*) Notice: Subject to any disclaimer, the term of this patent is extended or adjusted under 35 U.S.C. 154(b) by 0 days.

(21) Appl. No.: 12/082,539

(22) Filed: Apr. 11, 2008

(65) Prior Publication Data
US 2008/0290962 A1 Nov. 27, 2008

Related U.S. Application Data

(63) Continuation of application No. PCT/KR2005/004067, filed on Nov. 30, 2005.

(30) Foreign Application Priority Data
Oct. 13, 2005 (KR) ................. 2005-96749

(51) Int. Cl.
*H01P 1/10* (2006.01)
*H01P 5/20* (2006.01)
*H01P 3/08* (2006.01)

(52) U.S. Cl. ............... 333/103; 333/121; 333/246
(58) Field of Classification Search ........... 333/101, 333/103, 104, 121, 125, 122, 246, 247; 343/767, 343/770
See application file for complete search history.

(56) References Cited

U.S. PATENT DOCUMENTS

| 3,946,339 | A * | 3/1976 | Oltman et al. | 333/121 |
| 6,657,600 | B2 * | 12/2003 | Thudor et al. | 343/770 |
| 7,057,568 | B2 * | 6/2006 | Louzir et al. | 343/767 |
| 2008/0290963 | A1 * | 11/2008 | Kim | 333/103 |

\* cited by examiner

*Primary Examiner*—Dean O Takaoka
(74) *Attorney, Agent, or Firm*—Cha & Reiter, LLC (57) ABSTRACT

An RF switch is provided. In the RF switch, a T-junction slot line has a horizontal slot line and a vertical slot line. An open-end circuit is provided at each end portion of the horizontal and vertical slot lines. A first transmission line delivers signals from and to one portion of the horizontal slot line, and a second transmission line delivers signals from and to the other portion of the horizontal slot line. A third transmission line delivers signals from and to the vertical slot line. A switching circuit selectively switches the signal path of the one or the other portion of the horizontal slot line to the vertical slot line according to an external switching control signal.

22 Claims, 9 Drawing Sheets

FIG.1

PRIOR ART

RADIO FREQUENCY SWITCH

This application is a Continuation of PCT/KR05/004067 filed Nov. 30, 2005.

FIELD OF THE INVENTION

The present invention relates generally to a Radio Frequency (RF) switch, and in particular, to an RF switch suitable as a switch for switching between a transmission signal and a received signal at a signal transmission/reception (Tx/Rx) end in a Time Division Duplexing (TDD) system.

DESCRIPTION OF THE RELATED ART $2^{nd}$ and $3^{rd}$ generation mobile communication systems are mostly based on Frequency Division Duplexing (FDD). A duplexer separates a Tx signal from an Rx signal in FDD. In comparison, $3.5^{th}$ and $4^{th}$ generation mobile communication systems are expected to use TDD.

In time-division transmission schemes including TDD, communications are carried out with the same radio frequency time-divided between transmission and reception. One frame is divided for transmission and reception, for bi-directional communications by one frequency.

Figure 1:
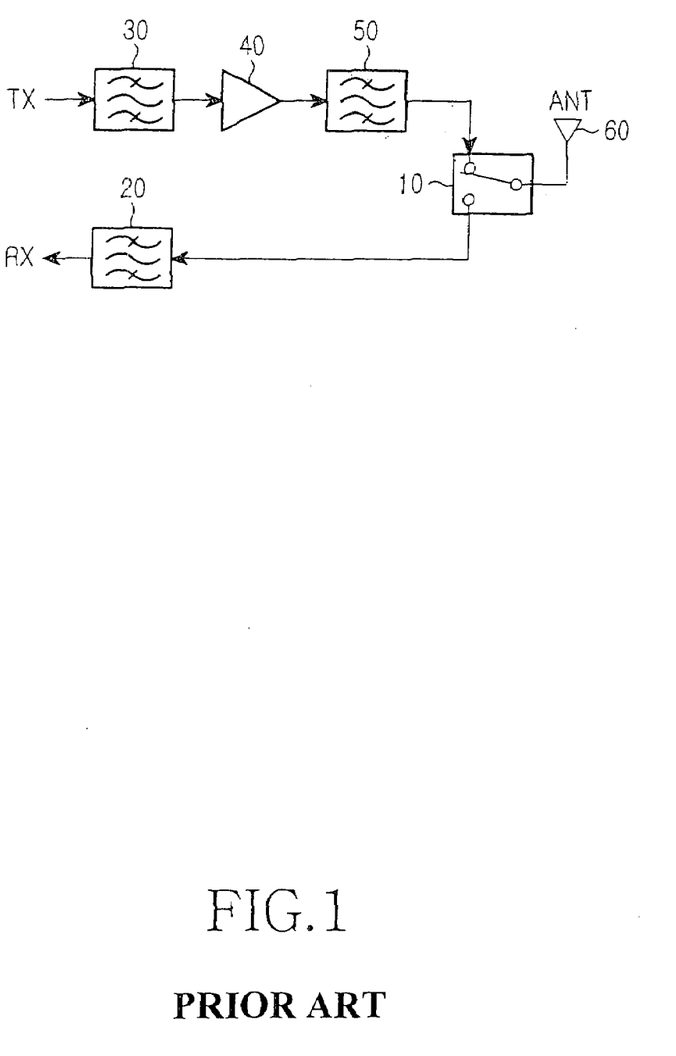
FIG. 1 is a block diagram of exemplary Tx and Rx ends in a typical TDD system.

FIG. 1 is a block diagram of Tx and Rx ends in a typical TDD system. Referring to FIG. 1, a Tx signal passes through a first Tx filter 30, is amplified to an appropriate power level in a power amplifier 40, is filtered in a second Tx filter 50, and then is radiated through an antenna (ANT) 60 through a Tx-Rx switch 10. For reception, a signal received through the ANT 60 is switched to an Rx filter 20 by the Tx-Rx switch 10 and passes through the Rx filter 20 only in an Rx frequency band. The Tx-Rx switch 10 switches according to a switching control signal received from a controller (not shown).

As described above, transmission alternates with reception on the same frequency every predetermined time period. That's why a high-speed Tx-Rx RF switch is needed.

Due to the requirement of high-speed switching, the RF switch uses a switch based on a semiconductor device such as a PIN diode or a Field Effect Transistor (FET) rather than a mechanical switch. However, the semiconductor switch is not feasible for high power because of the high power susceptibility of semiconductor.

When a high power is applied, much heat is created and thus without sufficient heat proofness, the switch is destroyed. An RF switch developed to withstand high power is equipped with a separately procured cooler and thus the RF switch is very expensive and hard to fabricate. Therefore, the RF switch is limited to military use.

To solve this problem, the TDD system used a circulator instead of an RF switch to separate a Tx signal from an Rx signal. However, the use of the circulator also has the distinctive drawback that sufficient isolation from a Tx signal during reception is difficult to achieve and in an open state caused by some defects in an antenna, the Tx signal is introduced into a receiver, thereby causing system malfunction or seriously decreasing the quality of the Rx signal.

DETAILED DESCRIPTION OF THE INVENTION

An object of the present invention is to substantially solve at least the above problems and/or disadvantages and to provide at least the advantages below. Accordingly, an object of the present invention is to provide an RF switch suitable for Tx-Rx switching in a TDD system for ensuring sufficient isolation between a Tx end and an Rx end.

Another object of the present invention is to provide an RF switch suitable for Tx-Rx switching in a TDD system for preventing introduction of Tx power into an Rx end when an antenna is opened.

A further object of the present invention is to provide an RF switch including a semiconductor device but having sufficient heat-proofness, for stably operating at high power.

Still another object of the present invention is to provide an RF switch easily fabricated in the form of a Microwave Integrated Circuit (MIC).

Yet another object of the present invention is to provide an RF switch for operating even in an RF band of tens of giga hertz or above as well as in a mobile communication frequency band.

The above objects are achieved by providing a radio frequency switch. In the radio frequency switch, a T-junction slot line includes a horizontal slot line, a vertical slot line, and an open-end circuit at each end of the horizontal and vertical slot lines. A first transmission line delivers signals to and from one end of the horizontal slot line. A second transmission line delivers signals to and from the other end of the horizontal slot line. A third transmission line delivers signals to and from the vertical slot line. A switching circuit selectively connects the vertical slot line to a signal path of the one of the horizontal slot line or a signal path of the other end of the horizontal slot line according to an external switching control signal.

EMBODIMENTS

Preferred embodiments of the present invention will be described herein below with reference to the accompanying drawings. In the following description, well-known functions or constructions are not described in detail since they would obscure the invention in unnecessary detail.

Figure 2:
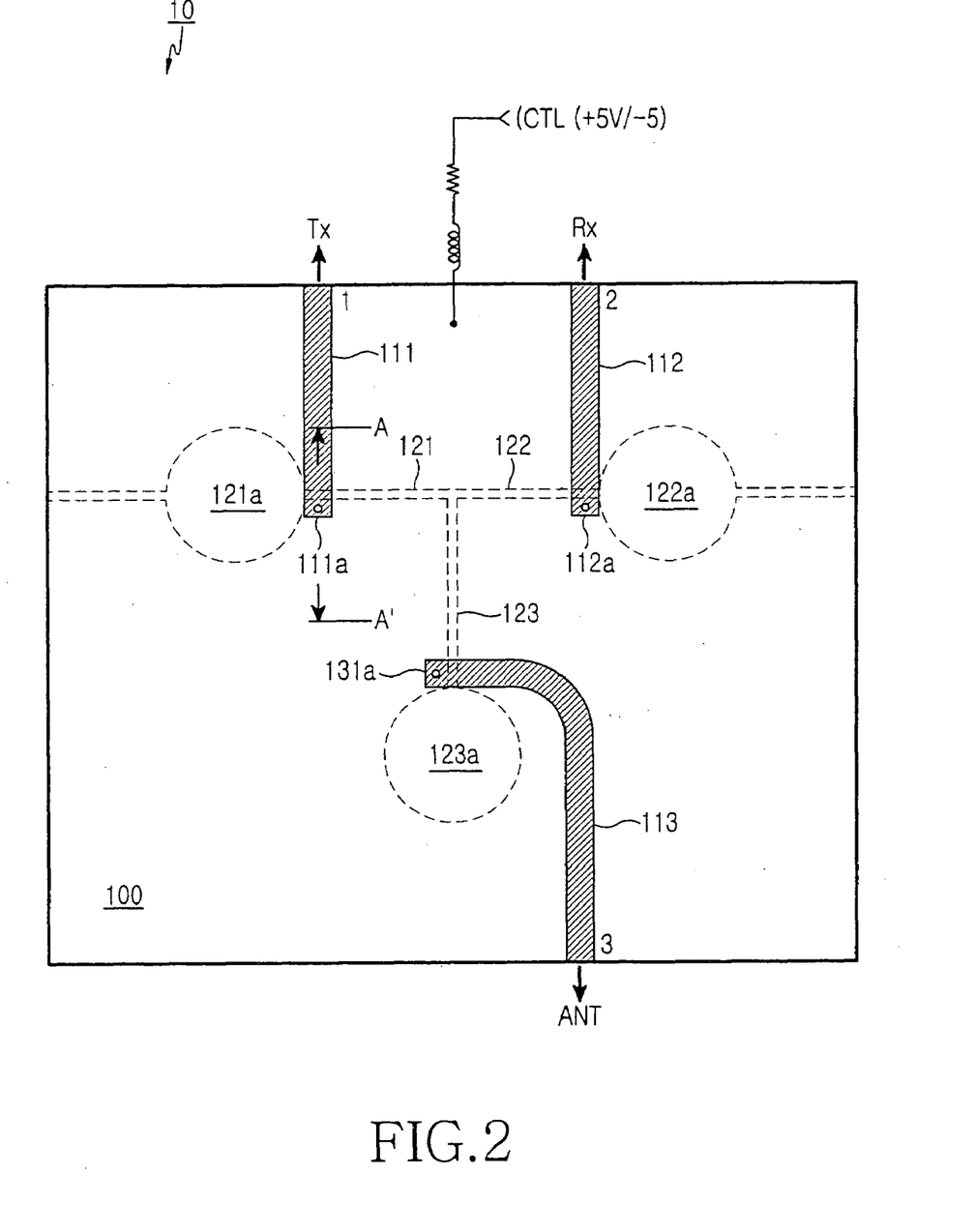
FIG. 2 is a plan view of the circuit pattern of the Printed Circuit Board (PCB) of an RF switch for Tx-Rx switching in a TDD system according to an embodiment of the present invention.
Figure 3:
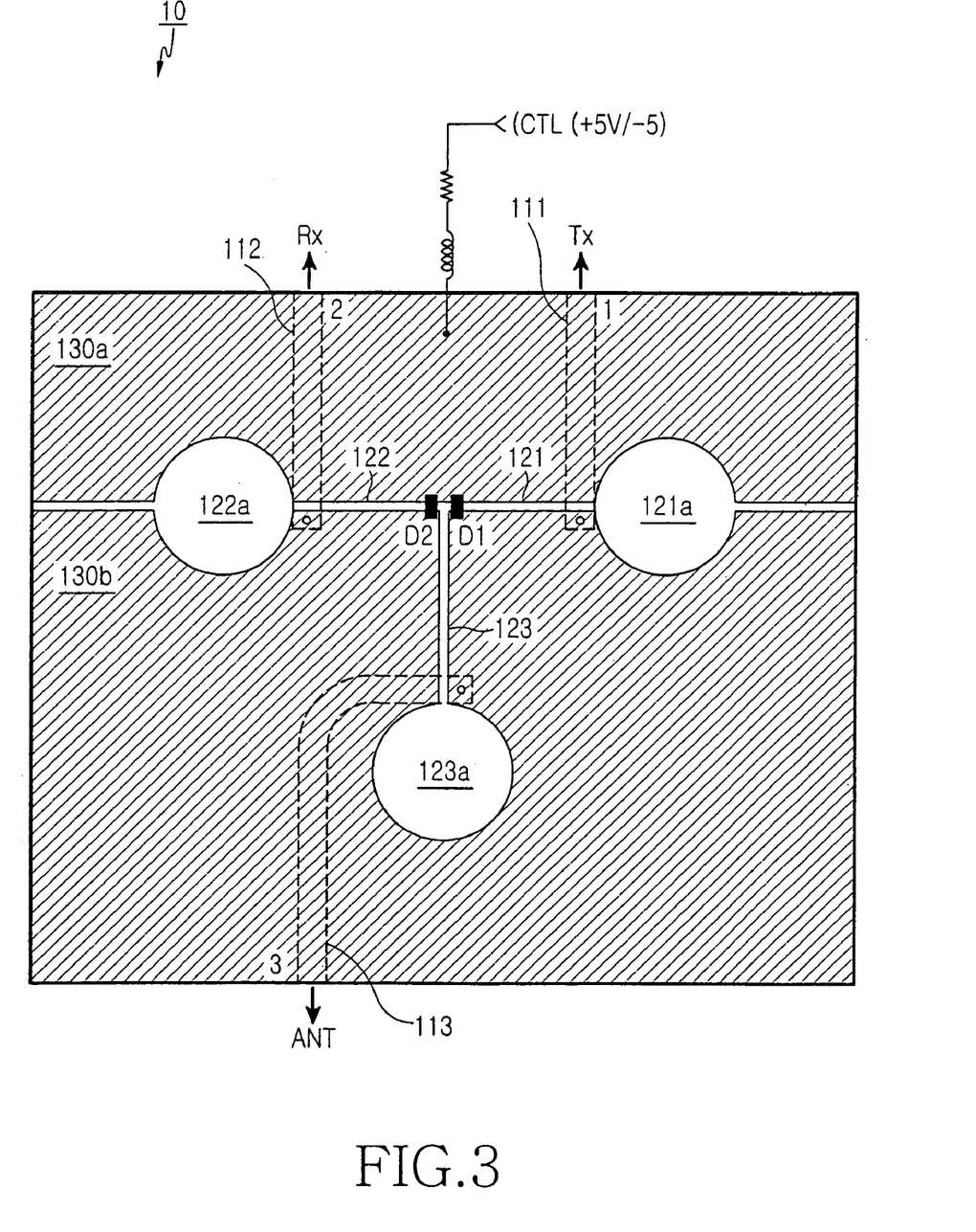
FIG. 3 is a bottom view of the circuit pattern of the PCB illustrated in FIG. 2.

FIG. 2 is a plan view of the circuit pattern of the PCB of an RF switch for Tx-Rx switching in a TDD system according to an embodiment of the present invention and FIG. 3 is a bottom view of the circuit pattern of the PCB illustrated in FIG. 2. The size and shape of each component is more or less enlarged or simplified for better understanding. Referring to FIGS. 2 and 3, an RF switch 10 according to an embodiment of the present invention may have microstrip lines and slot lines formed into appropriate patterns on a single PCB. In the RF switch 10, a T-junction slot line is formed beneath a dielectric substrate 100. The T-junction slot line includes horizontal slot lines 121 and 122, a vertical slot line 123, and open-end circuits 121a, 122a and 123a. A switching circuit is formed between one end of the horizontal slot line 121 and the other end of the horizontal slot line 122 at both sides of the vertical slot line 123, for switching the signal path of the one end of the horizontal slot line 121 or the signal path of the other end of the horizontal slot line 122 to the vertical slot line 123 according to a switching control signal CTL.

As illustrated in FIG. 2, this switching circuit may include a plurality of semiconductor switch devices, for example, first and second diodes D1 and D2. The first diode D1 is installed so as to short the gap of a connection between the vertical slot line 123 and the one end of the horizontal slot line 121. The second diode D2 is installed so as to short the gap between the vertical slot line 123 and the other end of the horizontal slot line 123. First, second and third microstrip lines 111, 112 and 113 are formed on the dielectric substrate 100, across the ends of the T-junction slot line, in order to transfer signals by microstrip-slot line coupling. These microstrip lines 111, 112 and 113 form first, second and third ports 1, 2 and 3 of the RF switch 10. The first port 1 or the second port 2 is selectively connected to the third port 3.

The microstrip lines and the slot lines are formed on and beneath the dielectric substrate 100 having an appropriate dielectric constant. The bottom of the dielectric substrate 100 is divided into ground plates 130a and 130b on which the T-junction slot line is formed. The open-end circuits 121a, 122a and 123a of the T-junction slot line are shaped into circles empty inside. The upper and lower ground plates 130a and 130b are electrically separated from each other with respect to the horizontal slot lines 121 and 122 in the illustrated case of FIG. 3.

Figure 6:
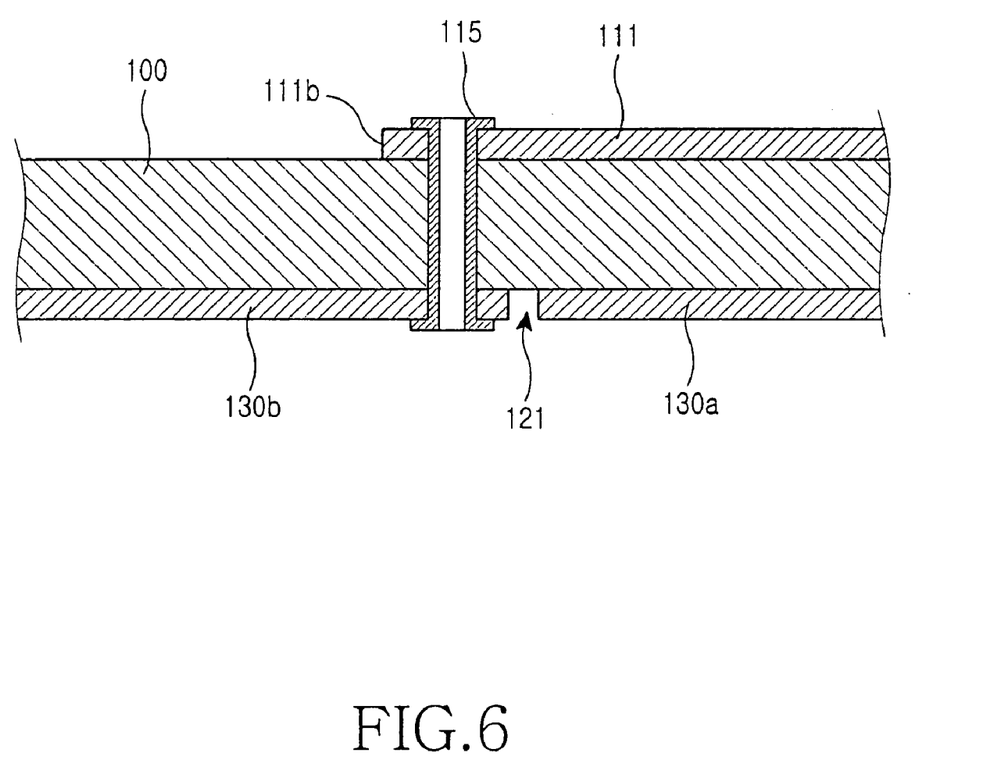
FIG. 6 is a partial sectional view of a short-end circuit of a microstrip line illustrated in FIG. 2.

The first, second and third microstrip lines 111, 112 and 113 are provided, at one ends thereof, with open-end or short-end circuits in the present invention. As illustrated in FIG. 6, short-end circuits 111a, 112a and 113a are formed by forming a circular hole at the end of each microstrip line and plating the inside of the hole with an appropriate conductive plating material 115, such that they are connected to the ground plate 130b.

Since the microstrip lines are formed across the slot lines, signals are transferred between them through microstrip-slot line coupling.

The first and second diodes D1 and D2 are installed across the gap of the one end of the horizontal slot line 121 and the gap of the other end of the horizontal slot line 122, for receiving the switching control signal CTL (i.e. a bias voltage) from the controller (not shown). The on and off operations of the first and second diodes D1 and D2 are mutually exclusive so that the signal path of the one end of the horizontal slot line 121 or the signal path of the other end of the horizontal slot line 122 is selectively connected to the vertical slot line 123.

Figure 4:
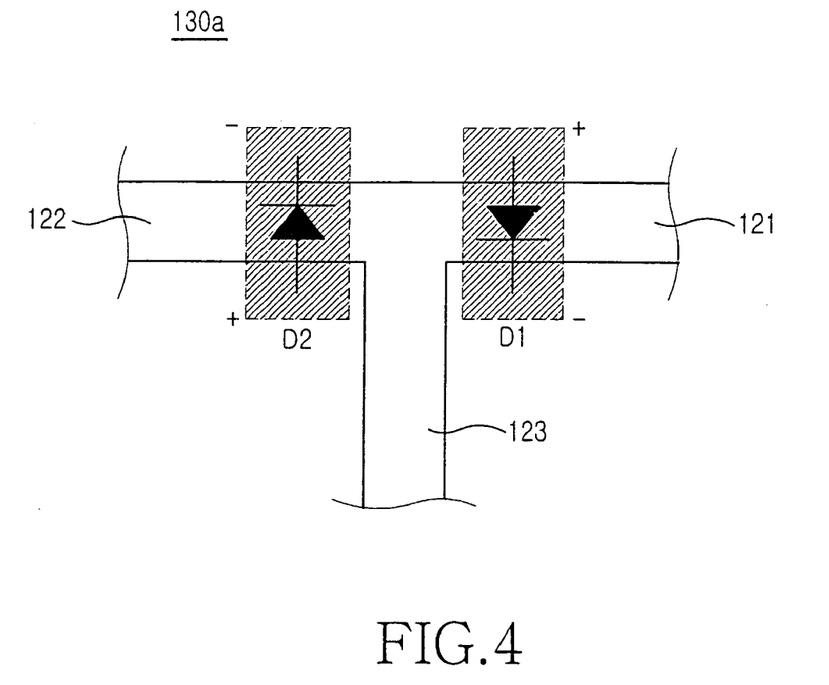
FIG. 4 is a detailed view of diode connected portions illustrated in FIG. 3.
Figure 5:
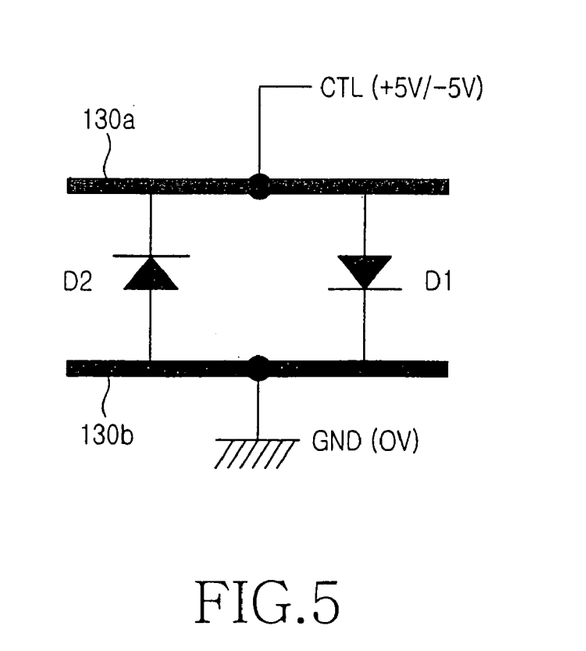
FIG. 5 is an equivalent circuit diagram of FIG. 4.

FIG. 4 is a detailed view of the diode connected portions illustrated in FIG. 3 and FIG. 5 is an equivalent circuit diagram of FIG. 4. With reference to FIGS. 4 and 5, the on and off switching of the first and second diodes D1 and D2 and the connection of the signal paths of the one end of the horizontal slot line 121 and the other end of the horizontal slot line 122 to the vertical slot line 123 will be described. The first and second diodes D1 and D2 are installed with opposite polarities across the gaps of the one end of the horizontal slot line 121 and the other end of the horizontal slot line 122 to short the upper and lower ground plates 130a and 130b. An appropriate bias voltage, for example, a switching control signal CTL of +5V or −5V is selectively applied to the upper ground plate 130a such that the first and second diodes D1 and D2 connected between the upper ground plate 130a and the lower ground plate 130b of 0V are mutually exclusively on and off. With the first or second diode D1 or D2 in an on-state, the gap of a corresponding slot line is electrically shorted. Hence, the signal path of the one end of the horizontal slot line 121 or the signal path of the other end of the horizontal slot line 122 is connected to the vertical slot line 123.

As the first, second and third ports 1, 2 and 3 of the microstrip lines 111, 112 and 113 are connected to a Tx end, an Rx end, and an ANT end, respectively, the RF switch 10 having the above configuration can be used as a switching device for Tx-Rx switching in the TDD system.

The operation of the RF switch 10 as the Tx-Rx switch in the TDD system will be described below.

For transmission, the first diode D1 is turned off and the second diode D2 is turned on. When a Tx signal travels along the first microstrip line 111, it is transferred to the one end of the horizontal slot line 121 through microstrip-slot line coupling. The Tx signal is sent to the vertical slot line 123 and then transferred to the third microstrip line 113 through microstrip-slot line coupling. The Tx signal is finally radiated through the ANT.

For reception, the first diode D1 is turned on and the second diode D2 is turned off. An Rx signal received through the third microstrip line 113 is sent to the second microstrip line 112 via the vertical slot line 123 and the other end of the horizontal slot line 122. The Rx signal is finally delivered to the Rx end.

In the RF switch configured and operated as described above according to the present invention, since the Tx signal is sent along the slot lines with the sufficient ground plates 130a and 130b, heat emission is active. Thus, the RF switch can withstand high power although it is implemented by use of semiconductor switches (i.e. diodes). In addition, the use of the slot lines and the semiconductor switches in combination enables separation of Tx and Rx signal paths.

Figure 7:
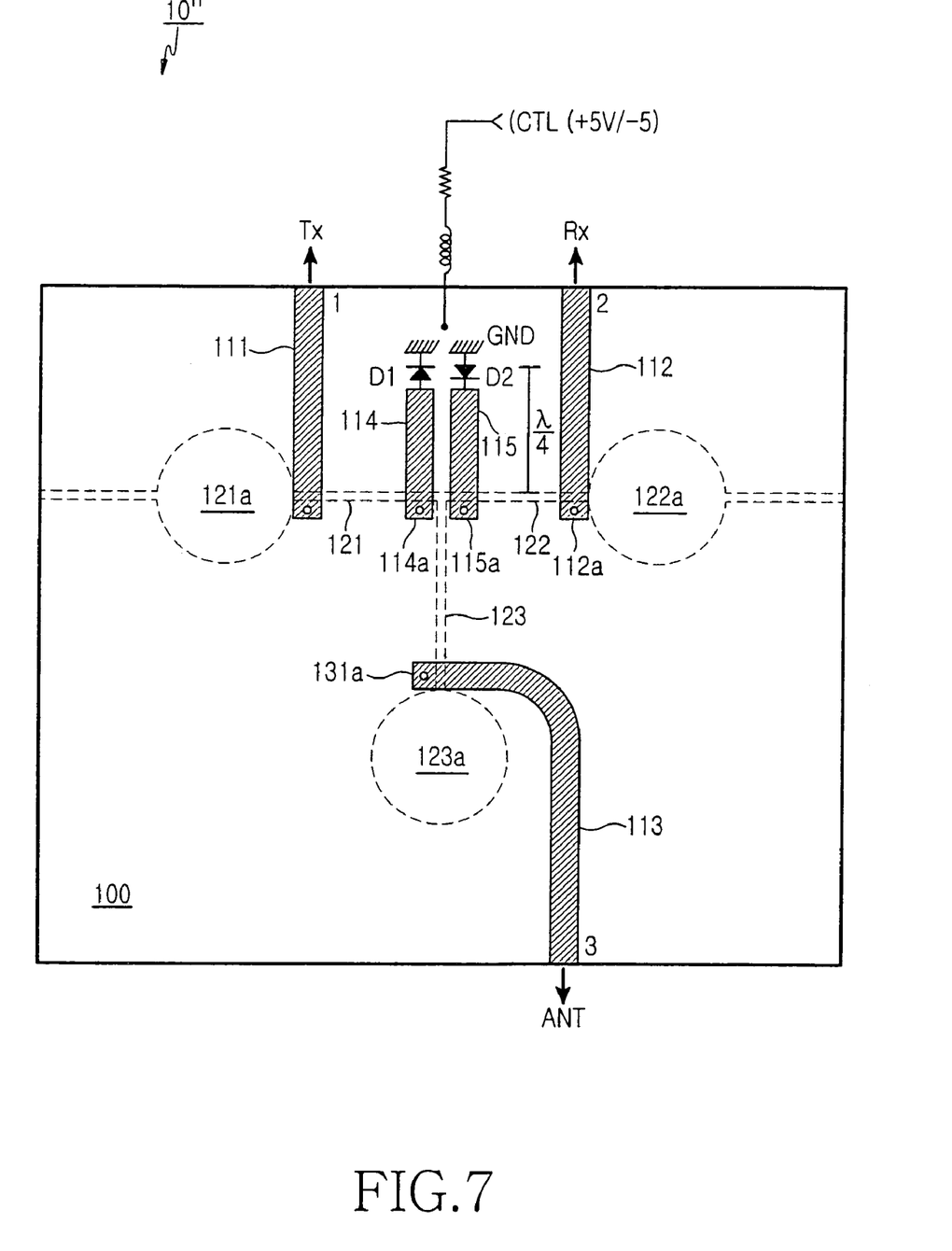
FIG. 7 is a plan view of the circuit pattern of the PCB of an RF switch for Tx-Rx switching in a TDD system according to another embodiment of the present invention.
Figure 8:
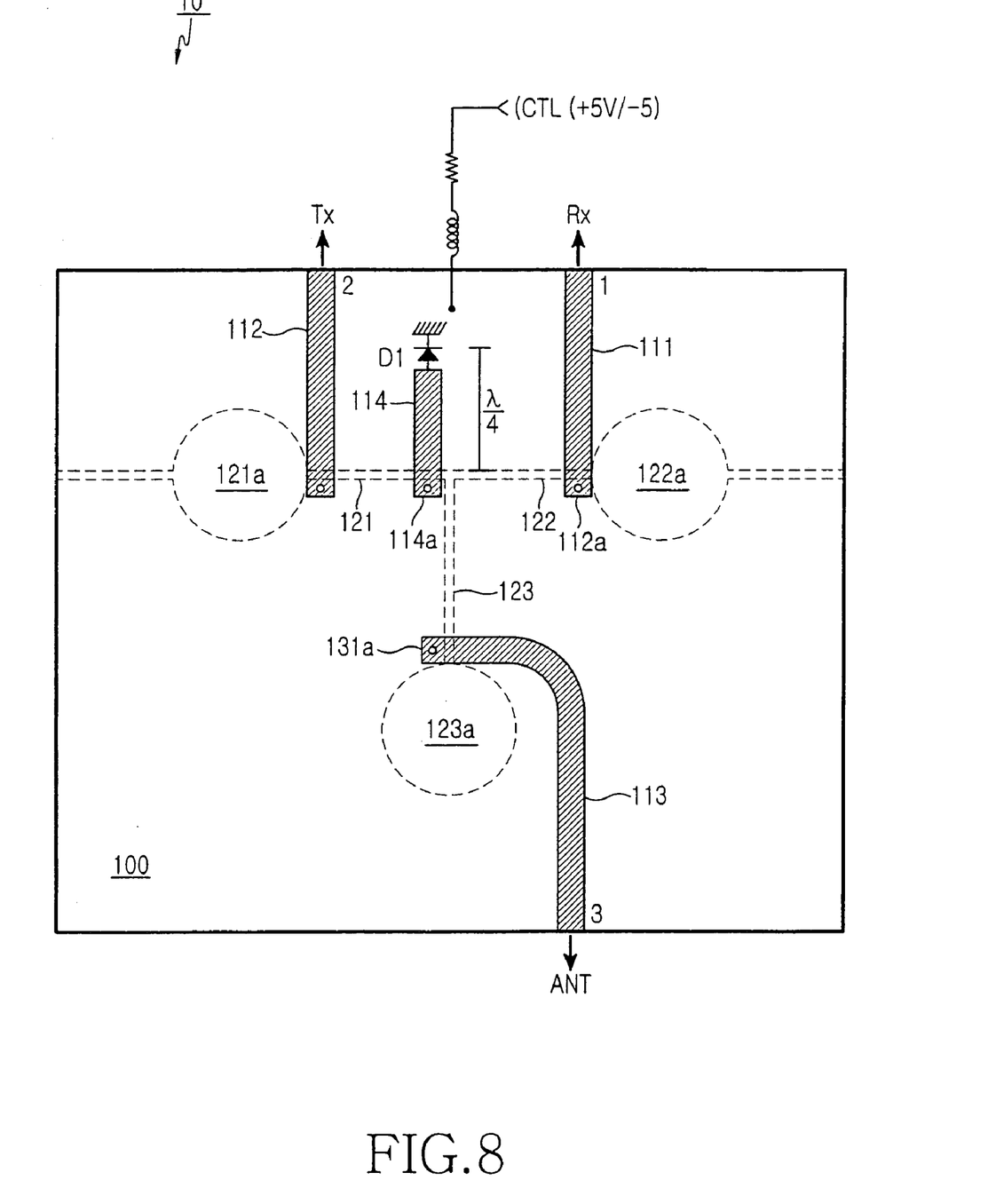
FIG. 8 is a bottom view of the circuit pattern of the PCB illustrated in FIG. 7.

FIG. 7 is a plan view of the circuit pattern of the PCB of an RF switch for Tx-Rx switching in a TDD system according to another embodiment of the present invention and FIG. 8 is a bottom view of the circuit pattern of the PCB illustrated in FIG. 7. The RF switch according to the second embodiment of the present invention is similar to that illustrated in FIG. 1 in configuration except for the configuration of a switching circuit between the one end of the horizontal slot line 121 and the other end of the horizontal slot line 122, for selectively connecting the signal path of the one end of the horizontal slot line 121 or the signal path of the other end of the horizontal slot line 122 to the vertical slot line 123 according to the switching control signal CTL.

Referring to FIGS. 7 and 8, in an RF switch 10' according to the second embodiment of the present invention, a switching circuit includes the first diode D1, a fourth microstrip line 114, and the second diode D2. The first diode D1 and the fourth microstrip line 114 are formed on the dielectric substrate 100, and the second diode D2 is formed beneath the dielectric substrate 100. The fourth microstrip line 114 crosses the connection between the one end of the horizontal slot line 121 and the vertical slot line 123. The fourth microstrip line 114 is provided, at one end thereof, with a short-end circuit 114a to be connected to the ground plate 130b beneath the dielectric substrate 100, and at the other end thereof, with the first diode D1 through which to be connected to a ground end. The first diode D1 can be connected to the ground end in the same configuration as that of the short-end circuits of the micro-strip lines. The length of the fourth microstrip line 114 from the first diode D1 to the one end of the horizontal slot line 121 or the other end of the horizontal slot line is λ/4.

The second diode D2 is installed to short the gap of the connection between the other end of the horizontal slot line 122 and the vertical slot line 123 as in the first embodiment of the present invention illustrated in FIG. 1. In the RF switch 10' illustrated in FIGS. 7 and 8, an appropriate switching control signal CTL is applied such that both the first and second diodes D1 and D2 are on or off at the same time. Therefore, the signal path of the one end of the horizontal slot line 121 or the signal path of the other end of the horizontal slot line 122 is selectively connected to the vertical slot line 123. This operation will be described in great detail in the case where the RF switch 10' works as a Tx-Rx switch in the TDD system.

For transmission, the first and second diodes D1 and D2 are turned on. As a Tx signal travels along the first microstrip line 111, it is transferred to the one end of the horizontal slot line 121 through microstrip-slot line coupling. The Tx signal is sent along the vertical slot line 123 and then transferred to the third microstrip line 113 through microstrip-slot line coupling. The Tx signal is finally radiated through the ANT.

Since the first diode D1 is in an on-state, the fourth microstrip line 114 has no influence on the one end of the horizontal slot line 121. The second diode D2 is also in the on-state and thus the gap of the other end of the horizontal slot line 122 is electrically shorted.

For reception, both the diodes D1 and D2 are turned off. An Rx signal received through the third microstrip line 113 is sent to the second microstrip line 112 via the vertical slot line 123 and the other end of the horizontal slot line 122. The Rx signal is then sent to the Rx end.

The Rx signal does not travel to the one end of the horizontal slot line 121. The reason is that since the first diode D1 is in an off state, the other end of the fourth microstrip line 114 becomes a λ/4 open end and as a result, the one end of the horizontal slot line 121 is grounded.

Figure 9:
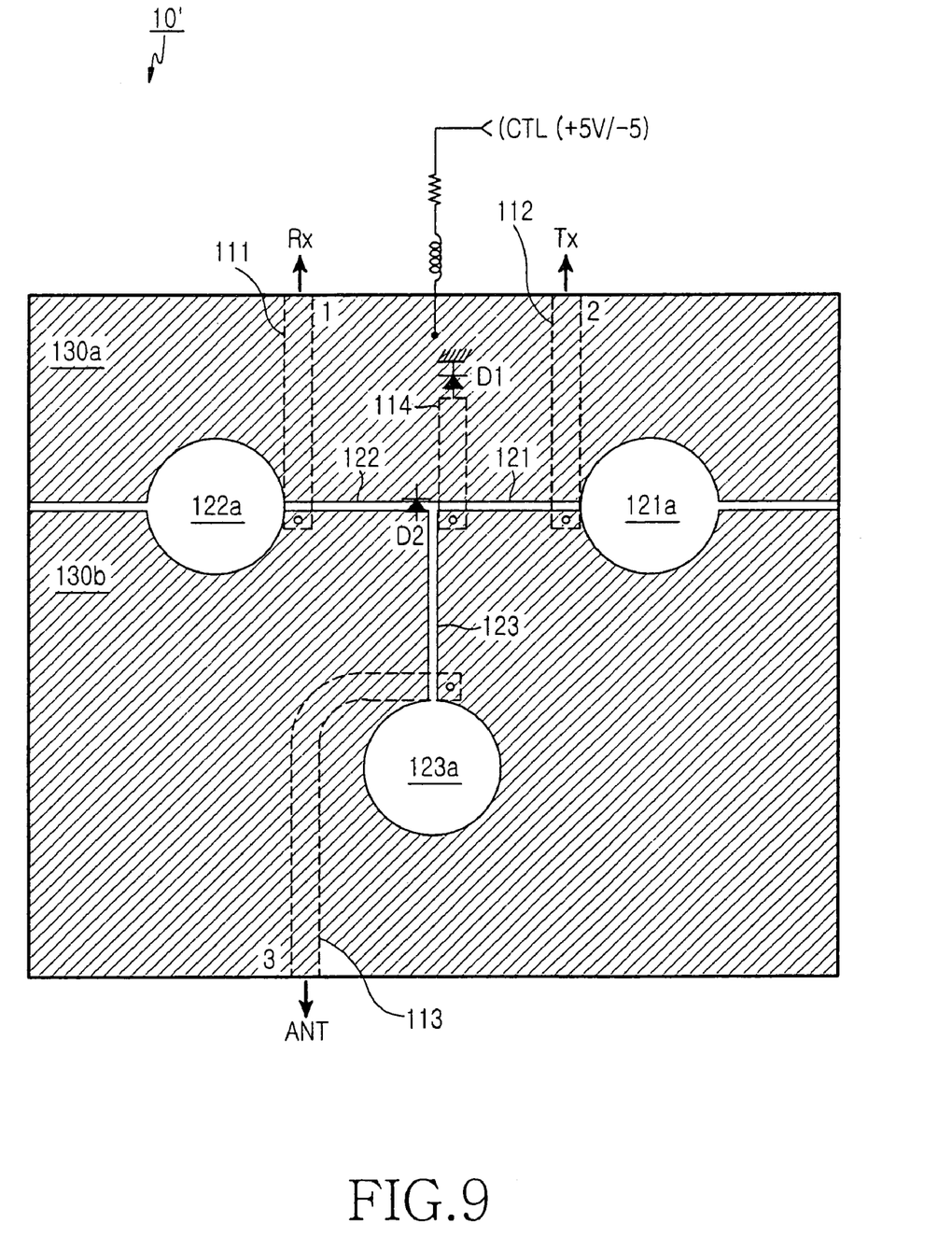
FIG. 9 is a plan view of the circuit pattern of the PCB of an RF switch for Tx-Rx switching in a TDD system according to a third embodiment of the present invention.

FIG. 9 is a plan view of the circuit pattern of the PCB of an RF switch for Tx-Rx switching in a TDD system according to a third embodiment of the present invention. This RF switch is similar to the RF switches according to the first and second embodiments of the present invention, except for a switching circuit configuration.

Referring to FIG. 9, an RF switch 10" has a switch circuit including the first and second diodes D1 and D2 and fourth and fifth microstrip lines 114 and 115 on the dielectric substrate 100. The fourth microstrip line 114 crosses the connection between the one end of the horizontal slot line 121 and the vertical slot line 123. The fifth microstrip line 115 crosses the connection between the other end of the horizontal slot line 122 and the vertical slot line 123.

Short-end circuits 114a and 115a are formed at one ends of the fourth and fifth microstrip lines 114 and 115, to be connected to the ground plate 130b beneath the dielectric substrate 100. The fourth and fifth microstrip lines 114 and 115 are provided, at the other ends thereof, with the first and second diodes D1 and D2 with opposite polarities, for connection to the ground end. The diodes D1 and D2 can be connected to the ground end in the same configuration as that of the short-end circuits of the micro-strip lines. The lengths of the fourth and fifth microstrip lines 114 and 115 from the first and second diodes D1 and D2 to the one end of the horizontal slot line 121 or the other end of the horizontal slot line 122 are λ/4. The operation of the RF switch 10" as a Tx-Rx switch in the TDD system will be described in great detail.

For transmission, the first diode D1 is turned on and the second diode D2 is turned off. As a Tx signal travels along the first microstrip line 111, it is transferred to the one end of the horizontal slot line 121 through microstrip-slot line coupling. The Tx signal is sent along the vertical slot line 123 and then transferred to the third microstrip line 113 through microstrip-slot line coupling. The Tx signal is finally radiated through the ANT. Since the first diode D1 is in an on-state, the fourth microstrip line 114 has no influence on the one end of the horizontal slot line 121.

The Tx signal does not travel to the other end of the horizontal slot line 122. The reason is that since the second diode D2 is in an off state, the other end of the fifth microstrip line 115 becomes a λ/4 open end and as a result, the one end of the horizontal slot line 121 is grounded.

For reception, the first diode D1 is turned off and the second diode D2 is turned on. An Rx signal received through the third microstrip line 113 is sent to the second microstrip line 112 via the vertical slot line 123 and the other end of the horizontal slot line 122. The Rx signal is then sent to the Rx end.

The Rx signal does not travel to the one end of the horizontal slot line 121. The reason is that since the first diode D1 is in the off state, the other end of the fourth microstrip line 114 becomes a λ/4 open end and as a result, the one end of the horizontal slot line 121 is grounded.

In this manner, one end of a slot line is grounded to separate transmission from reception. For this purpose, a microstrip-slot line coupling configuration is formed and a semiconductor switch is used to control grounding. Therefore, a high-power Tx signal has no direct influence on a semiconductor device, i.e. a diode and thus stable switching is achieved.

Figure 10:
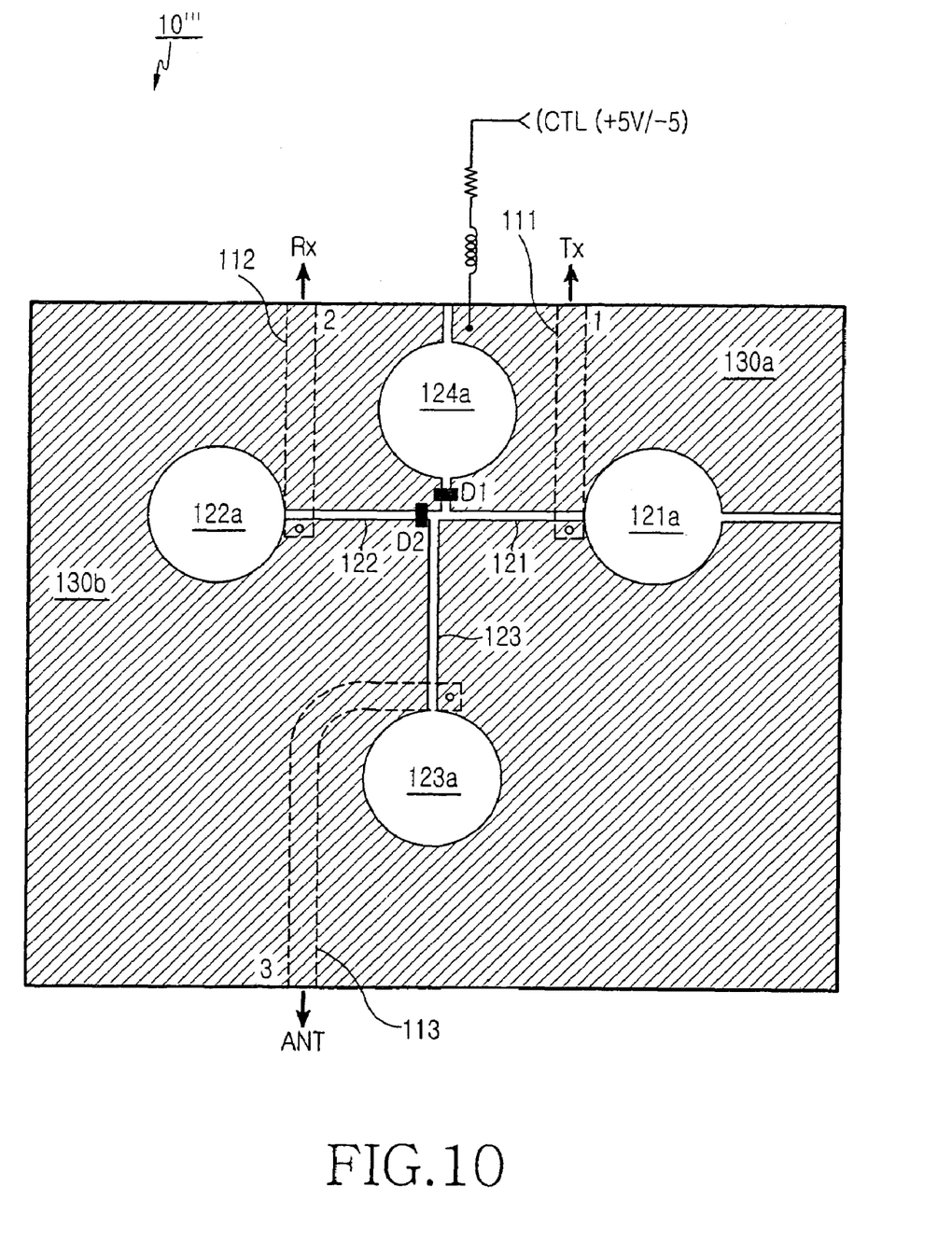
FIG. 10 is a bottom view of the circuit pattern of the PCB of an RF switch for Tx-Rx switching in a TDD system according to a fourth embodiment of the present invention.

FIG. 10 is a bottom view of the circuit pattern of the PCB of an RF switch for Tx-Rx switching in a TDD system according to a fourth embodiment of the present invention. This RF switch is similar to the RF switches according to the first, second and third embodiments of the present invention, except for a switching circuit configuration.

Referring to FIG. 10, an RF switch 10'" has a switching circuit including the first and second diodes D1 and D2 and a switching open-end circuit 124a beneath the dielectric substrate 100. The switching open-end circuit 124a is disposed at the connection between the one end of the horizontal slot line 121 and the vertical slot line 123. The first diode D1 is installed to short the gap of the connection between the switching open-end circuit 124a and the one end of the horizontal slot line 121. The second diode D2 is installed to short the gap of the connection between the other end of the horizontal slot line 122 and the vertical slot line 123 as in the first embodiment of the present invention illustrated in FIG. 1.

An appropriate switching control signal CTL is applied such that the first and second diodes D1 and 2 are concurrently on or off. Thus, the signal path of the one end of the horizontal slot line 121 or the signal path of the other end of the horizontal slot line 122 is selectively connected to the vertical slot line 123. The operation of the RF switch 10'" as a Tx-Rx switch in the TDD system will be described in great detail.

For transmission, the first and second diodes D1 and D2 are turned on. As a Tx signal travels along the first microstrip line 111, it is transferred to the one end of the horizontal slot line 121 through microstrip-slot line coupling. The Tx signal is sent along the vertical slot line 123 and then transferred to the third microstrip line 113 through microstrip-slot line coupling. The Tx signal is finally radiated through the ANT.

Since the first and second diodes D1 are in an on-state, the gap of the other end of the horizontal slot line 122 and the connection gap of the switching open-end circuit 124a are electrically shorted.

For reception, the first and second diodes D1 and D2 are turned off. An Rx signal received through the third microstrip line 113 is sent to the second microstrip line 112 via the vertical slot line 123 and the other end of the horizontal slot line 122. The Rx signal is then sent to the Rx end.

The Rx signal does not travel to the one end of the horizontal slot line 121. The reason is that since the first diode D1 is in an off state, the connection between the one end of the horizontal slot line 121 and the vertical slot line 123 is opened by the switching open-end circuit 124a.

While the invention has been shown and described with reference to certain preferred embodiments thereof, they are mere exemplary applications. For example, the microstrip lines can be replaced with strip lines, coaxial cables, or Coplanar Waveguides (CPWs). Also, Coplanar Strips may substitute for the slot lines. While diodes are adopted as switching devices in the embodiments, any other semiconductor device with the switching function (e.g. FETs) can be used.

Therefore, it will be understood by those skilled in the art that various changes in form and details may be made therein without departing from the spirit and scope of the invention as defined by the appended claims.

INDUSTRIAL USABILITY

As described above, the Tx-Rx switching device for a TDD system according to the present invention ensures sufficient isolation between Tx and Rx paths.

Tx power fully reflected and introduced into an Rx end can be remarkably reduced even when an antenna is opened.

Since a Tx signal is transferred along a slot line with a sufficient ground plate, high-speed switching is enabled using a semiconductor device and that at a high power level.

Due to easy application in the form of an MIC, the Tx-Rx switching circuit can be fabricated during a general semiconductor process.

Furthermore, the Tx-Rx switch can be used in an RF band of tens of giga hertz or above as well as in a mobile communication frequency band. Therefore, it can be easily applied to satellite communications and military radars.

What is claimed is:

1. A radio frequency switch comprising:
   a T-junction slot line including a horizontal slot line, a vertical slot line, and an open-end circuit at each end of the horizontal and vertical slot lines;
   a first transmission line for delivering signals to and from one end of the horizontal slot line;
   a second transmission line for delivering signals to and from the other end of the horizontal slot line;
   a third transmission line for delivering signals to and from the vertical slot line; and
   a switching circuit for selectively connecting the vertical slot line to a signal path of the one of the horizontal slot line or a signal path of the other end of the horizontal slot line according to an external switching control signal.

2. The radio frequency switch of claim 1, wherein the switching circuit includes:
   a first switching device formed for shorting the gap of a connection between the vertical slot line and the one end of the horizontal slot line according to the switching control signal; and
   a second switching device formed for shorting the gap of a connection between the vertical slot line and the other end of the horizontal slot line according to the switching control signal, and turning on or off mutually exclusively from the first switching device.

3. The radio frequency switch of claim 2, wherein the first and second switching devices are diodes, the horizontal slot line electrically divides an upper ground plate from a lower ground plate, and a predetermined bias voltage is applied to the upper or lower ground plate by the switching control signal.

4. The radio frequency switch of claim 1, wherein the switching circuit includes:
   a fourth transmission line formed across the connection between the vertical slot line and the one end of the horizontal slot line, having one end provided with a short-end circuit and the other end connected to a ground end through the first switching device, and having a length of $\lambda/4$ from the first switching device to the other end of the horizontal slot line; and
   a second switching device formed for shorting the gap of the connection between the vertical slot line and the other end of the horizontal slot line according to the switching control signal,
   wherein the first and second switching devices turn on or off concurrently according to the switching control signal.

5. The radio frequency switch of claim 4, wherein the first and second switching devices are diodes or field effect transistors (FETs).

6. The radio frequency switch of claim 1, wherein the switching circuit includes:
   a fourth transmission line formed across the connection between the vertical slot line and the one end of the horizontal slot line, having one end provided with a short-end circuit and the other end connected to a ground end through the first switching device, and having a length of $\lambda/4$ from the first switching device to the other end of the horizontal slot line; and
   a fifth transmission line formed across the connection between the vertical slot line and the other end of the horizontal slot line, having one end provided with a short-end circuit and the other end connected to a ground end through the second switching device, and having a length of $\lambda/4$ from the second switching device to the other end of the horizontal slot line,
   wherein the first and second switching devices turn on or off mutually exclusively according to the switching control signal.

7. The radio frequency switch of claim 6, wherein the first and second switching devices are diodes or FETs.

8. The radio frequency switch of claim 1, wherein the switching circuit includes:
   a switching open-end circuit formed at the connection between the vertical slot lien and the one end of the horizontal slot line;
   a first switching device formed for shorting the gap of a connection between the switching open-end circuit and the one end of the horizontal slot line according to the switching control signal; and
   a second switching device formed for shorting the gap of a connection between the switching open-end circuit line and the other end of the horizontal slot line according to the switching control signal.

9. The radio frequency switch of claim 8, wherein the first and second switching devices are diodes or FETs.

10. The radio frequency switch of claim 1, wherein each of the first, second and third transmission lines is one of a microstrip line, a strip line, a coaxial line, and a coplanar waveguide (CPW).

11. The radio frequency switch of claim 1, wherein each of the first, second and third transmission lines is provided, at one end thereof, with an open-end or short-end circuit.

12. A radio frequency switch for switching between transmission and reception in a time division duplexing/multiplexing system, comprising:
- a T-junction slot line including a horizontal slot line, a vertical slot line, and an open-end circuit at each end of the horizontal and vertical slot lines;
- a first transmission line for delivering a transmission signal to one end of the horizontal slot line;
- a second transmission line for delivering a reception signal received from the other end of the horizontal slot line to a reception end;
- a third transmission line for delivering the transmission signal received from the vertical slot line to an antenna or delivering the reception signal received from the antenna to the vertical slot line; and
- a switching circuit for selectively connecting the vertical slot line to a signal path of the one of the horizontal slot line or a signal path of the other end of the horizontal slot line according to an external switching control signal.

13. The radio frequency switch of claim 12, wherein the switching circuit includes:
- a first switching device formed for shorting the gap of a connection between the vertical slot line and the one end of the horizontal slot line according to the switching control signal; and
- a second switching device formed for shorting the gap of a connection between the vertical slot line and the other end of the horizontal slot line according to the switching control signal, and turning on or off mutually exclusively from the first switching device.

14. The radio frequency switch of claim 13, wherein the first and second switching devices are diodes, the horizontal slot line electrically divides an upper ground plate from a lower ground plate, and a predetermined bias voltage is applied to the upper or lower ground plate by the switching control signal.

15. The radio frequency switch of claim 12, wherein the switching circuit includes:
- a fourth transmission line formed across the connection between the vertical slot line and the one end of the horizontal slot line, having one end provided with a short-end circuit and the other end connected to a ground end through the first switching device, and having a length of $\lambda/4$ from the first switching device to the other end of the horizontal slot line; and
- a second switching device formed for shorting the gap of the connection between the vertical slot line and the other end of the horizontal slot line according to the switching control signal, wherein the first and second switching devices turn on or off concurrently according to the switching control signal.

16. The radio frequency switch of claim 15, wherein the first and second switching devices are diodes or field effect transistors (FETs).

17. The radio frequency switch of claim 12, wherein the switching circuit includes:
- a fourth transmission line formed across the connection between the vertical slot line and the one end of the horizontal slot line, having one end provided with a short-end circuit and the other end connected to a ground end through the first switching device, and having a length of $\lambda/4$ from the first switching device to the other end of the horizontal slot line; and
- a fifth transmission line formed across the connection between the vertical slot line and the other end of the horizontal slot line, having one end provided with a short-end circuit and the other end connected to a ground end through the second switching device, and having a length of $\lambda/4$ from the second switching device to the other end of the horizontal slot line, wherein the first and second switching devices turn on or off mutually exclusively according to the switching control signal.

18. The radio frequency switch of claim 17, wherein the first and second switching devices are diodes, the horizontal slot line electrically divides an upper ground plate from a lower ground plate, and a predetermined bias voltage is applied to the upper or lower ground plate by the switching control signal.

19. The radio frequency switch of claim 12, wherein the switching circuit includes:
- a switching open-end circuit formed at the connection between the vertical slot lien and the one end of the horizontal slot line;
- a first switching device formed for shorting the gap of a connection between the switching open-end circuit and the one end of the horizontal slot line according to the switching control signal; and
- a second switching device formed for shorting the gap of a connection between the switching open-end circuit line and the other end of the horizontal slot line according to the switching control signal.

20. The radio frequency switch of claim 19, wherein the first and second switching devices are diodes or FETs.

21. The radio frequency switch of claim 12, wherein each of the first, second and third transmission lines is one of a microstrip line, a strip line, a coaxial line, and a coplanar waveguide (CPW).

22. The radio frequency switch of claim 12, wherein each of the first, second and third transmission lines is provided, at one end thereof, with an open-end or short-end circuit.

* * * * *

UNITED STATES PATENT AND TRADEMARK OFFICE
CERTIFICATE OF CORRECTION

| | | |
|---|---|---|
| PATENT NO. | : 7,564,323 B2 | Page 1 of 1 |
| APPLICATION NO. | : 12/082539 | |
| DATED | : July 21, 2009 | |
| INVENTOR(S) | : Duk-Yong Kim et al. | |

It is certified that error appears in the above-identified patent and that said Letters Patent is hereby corrected as shown below:

Column 1, beginning with line 3, should read as follows:

--This application is a Continuation of PCT/KR05/004067 filed on November 30, 2005, which in turn claims a priority to a Korean Patent Application 2005-96749 filed on October 13, 2005.--

Signed and Sealed this

Sixth Day of July, 2010

David J. Kappos
*Director of the United States Patent and Trademark Office*